United States Patent [19]

Toms

[11] 4,197,597
[45] Apr. 15, 1980

[54] WATER RECYCLING WITH SOLIDS AND FOAM REMOVAL

[75] Inventor: Ed P. Toms, Arlington, Va.

[73] Assignee: The Water-Cyk Corporation, Vienna, Va.

[21] Appl. No.: 945,475

[22] Filed: Sep. 25, 1978

Related U.S. Application Data

[63] Continuation-in-part of Ser. No. 707,340, Jul. 21, 1976, Pat. No. 4,115,879.

[51] Int. Cl.² .............................................. E05F 5/18
[52] U.S. Cl. .............................................. 4/300; 4/2; 4/318; 4/DIG. 19; 210/138; 210/205; 210/533
[58] Field of Search ................ 4/1, 2, 3, 115, 209 FF, 4/300, 317, 318, 322, 323, DIG. 19; 210/83, 167, 170, 172, 175, 153, 138, 205, 206, 513, 532, 533

[56] References Cited

U.S. PATENT DOCUMENTS

| | | | |
|---|---|---|---|
| 2,029,691 | 2/1963 | Robinson | 210/513 X |
| 2,920,635 | 1/1960 | Wilson | 210/172 X |
| 3,849,305 | 11/1974 | Manjikian | 210/138 X |
| 3,912,487 | 10/1975 | Sharanov et al. | 210/196 X |
| 4,017,395 | 4/1977 | Davis | 4/317 X |
| 4,115,879 | 9/1978 | Toms | 210/175 X |

Primary Examiner—William A. Cuchlinski, Jr.
Attorney, Agent, or Firm—Mason, Mason and Albright

[57] ABSTRACT

A water economizing system for new or existing buildings where the waste lines of lavatory sinks, showers and clothes washing machines are connected to a storage reservoir for accumulation of water therein. This accumulated water is filtered and treated and thereafter used for the operation of water closets of toilets, the storage reservoir providing for the removal of solids and foam by flushing action at the top and subsequently by the gravitational separation of solids which are periodically flushed from the bottom of the reservoir into the sewer. The pumping action which delivers the accumulated water to the water closets of toilets may optionally be hydraulically operated by a portion of the water drained to the storage reservoir.

11 Claims, 11 Drawing Figures

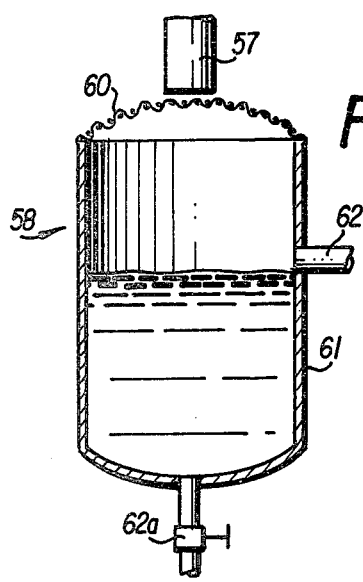
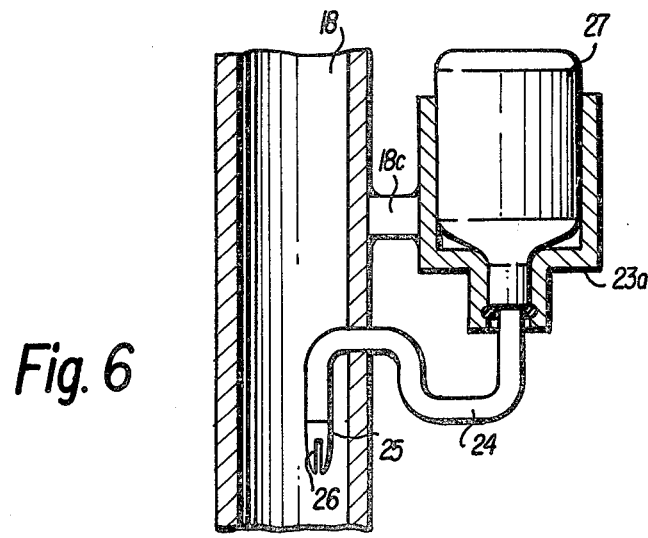
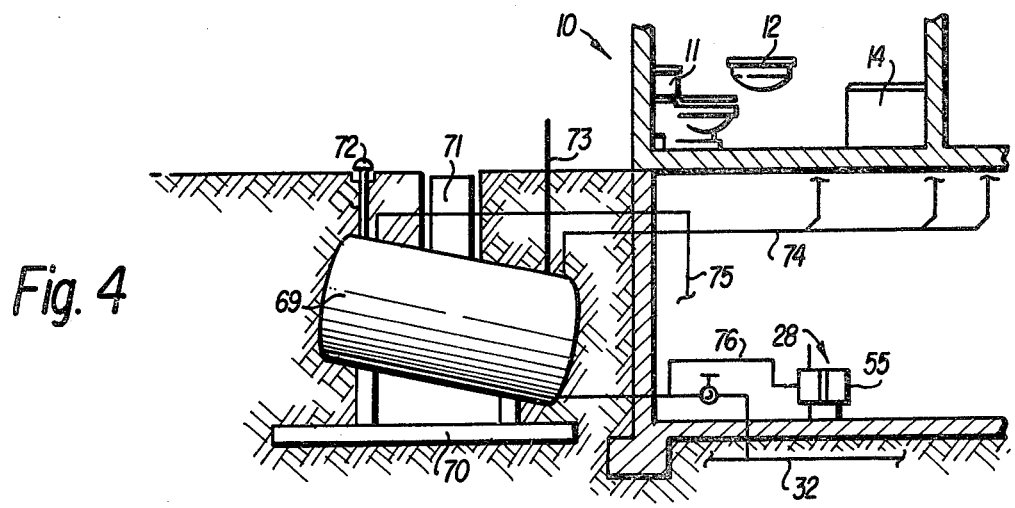
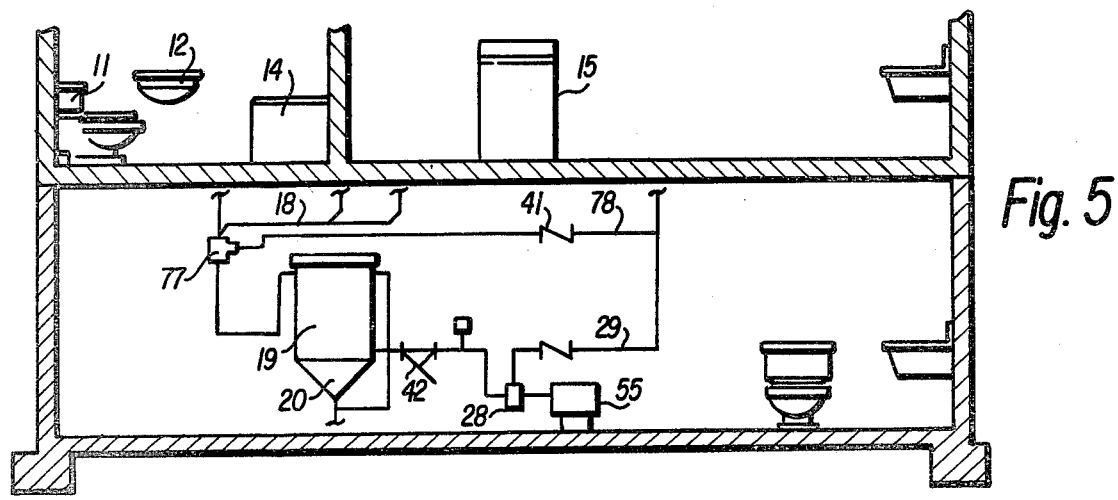

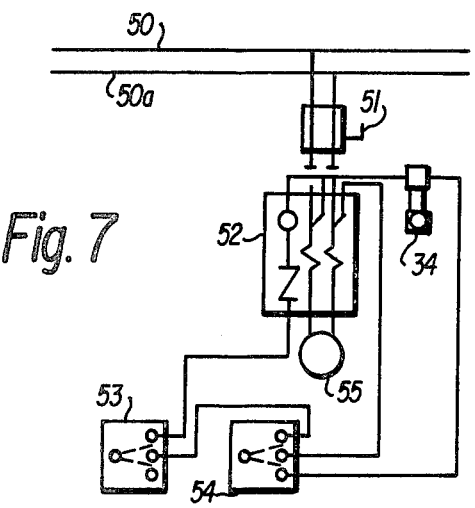
Fig. 7
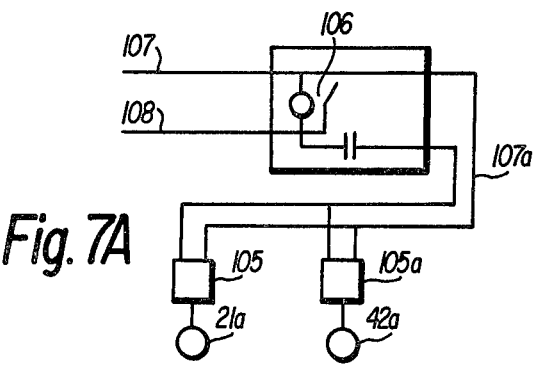
Fig. 7A
Fig. 8
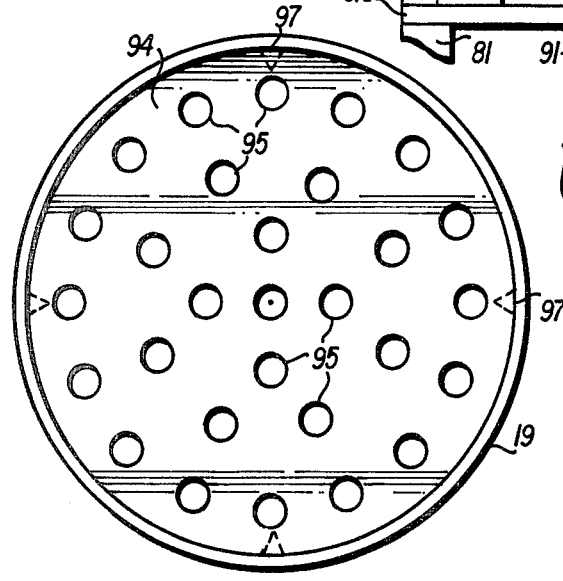
Fig. 9
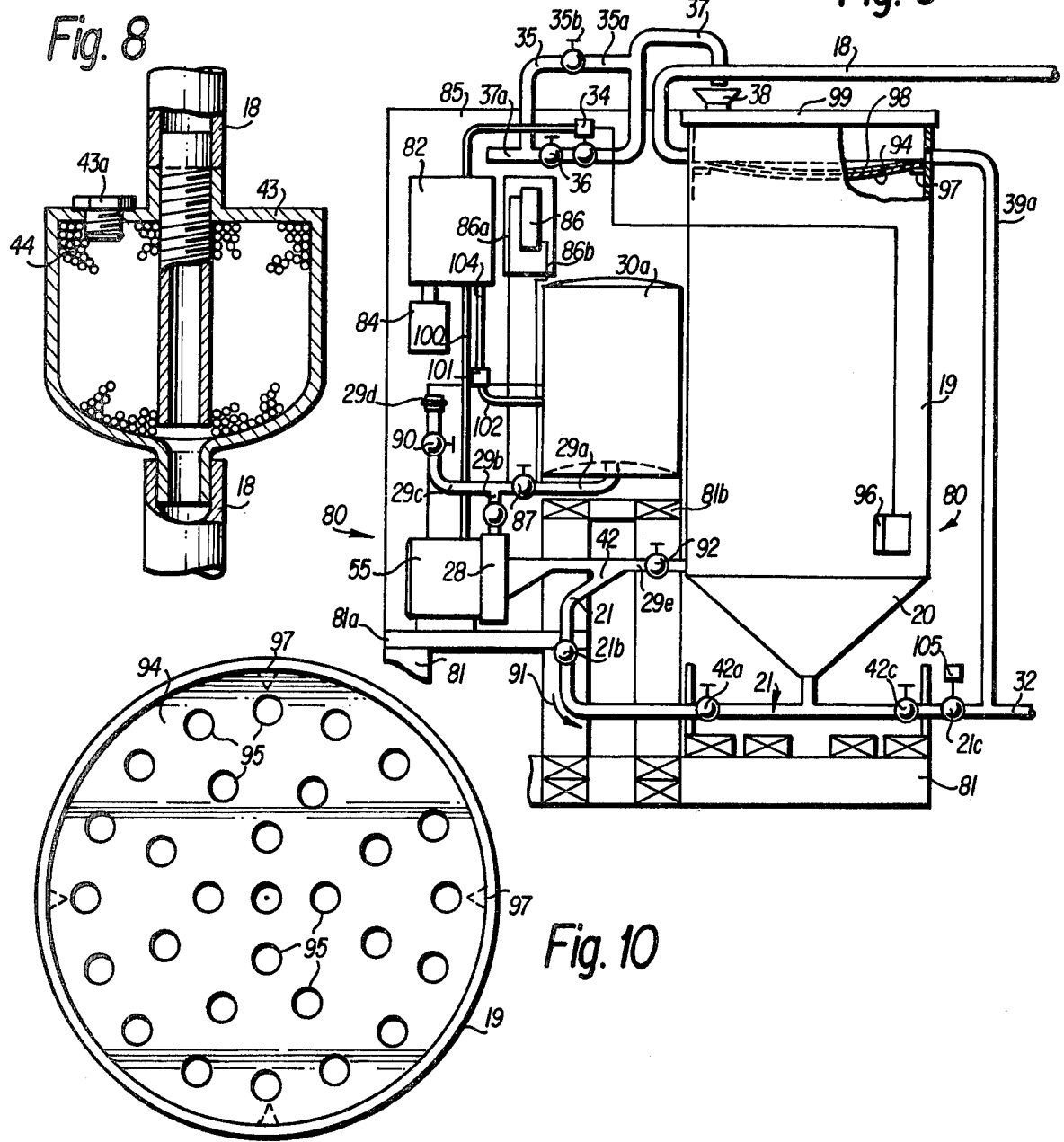
Fig. 10

WATER RECYCLING WITH SOLIDS AND FOAM REMOVAL

RELATED APPLICATIONS

This is a continuation-in-part of my application Ser. No. 707,340 filed July 21, 1976 (U.S. Pat. No. 4,115,879 of Sept. 26, 1978).

BACKGROUND OF THE INVENTION

One of the most essential ingredients for life is wholesome, palatable drinking water. Throughout the history of mankind, wars have been fought over the possession and ownership of bodies of potable water. Man may exist for weeks upon nothing but water and its essential value has always been recognized.

In modern times, through industrialization, urbanization and population growth, vast sources of clean water have been eliminated or so contaminated as to be rendered unfit for human consumption. The invention involves a system whereby available water supplies are more judiciously utilized by improved and more effective distribution, thus saving an additional twenty-five percent, or more, without harmful effect to the consumer or the community.

In household sinks and showers of conventional systems currently in use, the water is soiled by soap and material washed from a person's body, and discharged to a sewer drain. With laundry washing machines the sewer discharged water is soiled by the detergent and the dirt from the laundry. With rain water the detritus is largely leaves, twigs and air borne matter such as soot and dust. Such water is commonly referred to as "gray water."

In water closets of toilets, where proper functioning is predicated upon the provision of a proper liquid volumetric vehicle, usually several gallons of water are required to carry off the waste contained therein. Although it is not essential that the water used in these devices be potable in the strict sense it should not be so contaminated as to pose a danger to children and animals. The waste entailed in conventional systems is not only of natural resources but also is an unnecessary drain on the user.

The invention provides a system where the liquid discharge from the sinks, showers and washing machines of a household is stored in a suitable reservoir, supplied to the water closets when needed and then ultimately discharged to the sewer. However, for such a system to be acceptable, it is necessary that it is able to operate continuously in an adequately sanitary manner with minimum maintenance. With pilot and experimental installations, it has been learned that after about six months a faint but discernible odor begine to emanate from the reservoir. Thus, an important aspect of the invention relates to the reservoir and associated equipment whereby the gray water therein is adequately flushed and maintained sufficiently clean to preclude the emission of undesirable odors even after a relatively long period os use.

DESCRIPTION OF THE PRIOR ART

A patent to Call, U.S. Pat. No. 3,112,497, issued Dec. 3, 1963, discloses a water conservation system where the same water is used for two purposes before being discharged. An O'Brien et al, U.S. Pat. No. 3,183,525, issued May 18, 1965 relates to a water conservation device for use in a fallout shelter. A patent issued Mar. 2, 1971, to Kemperer, U.S. Pat. No. 3,567,032, discloses a diaphragm type pump used in a recirculating samitary system. A patent to Reid, U.S. Pat. No. 3,594,825, issued July 27, 1971, is directed to a system for storing water that has been used in a shower or basin and reusing it in a flush toilet. Of particular interest is a pamphlet entitled "Demonstration of Waste Flow Reduction from Households" EPA-670/2-74-071, September 1974, distributed by U.S. National Environmental Research Center, Office of Research and Development, U.S. Environmental Protection Agency, Cincinnati, Ohio 45268. This pamphlet discusses various means for the conservation of water and including consideration of systems for recycling water that has been used for washing and showering, so that it may be used for flush toilets or the like.

A patent to Lankton, U.S. Pat. No. 2,419,319, issued Apr. 22, 1947 relates to a portable housing unit adapted to be prefabricated as a factory item and mounted as a unit in a building. Other patents of interest are U.S. Pat. Nos. 1,200,126 to Mitchell, 1,946,163 to Hiett, 2,190,812 to Wahlmark, 2,974,800 to Fleischmann, 3,815,159 to Delaney et al, and 3,849,305 to Majikian.

BRIEF SUMMARY OF THE INVENTION

An object of this invention is, broadly, a practical household system wherein all or a portion of the water that is usually discharged to the sewer is satisfactoruly treated and preserved for use in another facility before its ultimate disposal.

A further object of this invention is a waste water conservation system comprising a practicable process and apparatus for sanitizing, maintaining free from undesirable emissions for a relatively long period, and reusing the waste water from sinks, showers and washing machines for water closets of toilets.

Another object of this invention is a process and apparatus for the conservation of water, comprising the accumulation and storage or rain water from roof gutters, to be admixed with water from household sinks, showers or washing machines and ultimately used for water closets of toilets or garbage disposals.

A yet further object of this invention is a process and apparatus as above-mentioned, wherein a disinfectant material is added to the stored liquid prior to use in the water closet.

Alternatively, the salvaged water may be caused to flow through, or otherwise be exposed to, a supply of iodine crystals which cleanse the water.

Other objects, adaptabilities and capabilities of the invention will appear as the description progresses, reference being had to the accompanying drawings, which:

BRIEF DESCRIPTION OF THE DRAWINGS

FIG. 3 is an enlarged detail of the storm water sediment trap;

FIG. 4 discloses another modification for use with an outdoor tank;

FIG. 5 shows a further modification for use with a hydraulic ram;

FIG. 6 is an enlarged detail in section illustrating the mixing of chlorine, or the like, and bluing with the previously used water;

FIG. 7 is a wiring diagram of the pressure responsive system for the tank;

FIG. 7A is a pump wiring diagram;

FIG. 8 illustrates an alternative water disenfectant apparatus;

FIG. 9 illustrates the apparatus of the invention in a self-contained transportable unit; and FIG. 10 is a plan view illustrating a plastic support for a filter within a tank.

DESCRIPTION OF THE PREFERRED EMBODIMENTS

Figure 1:
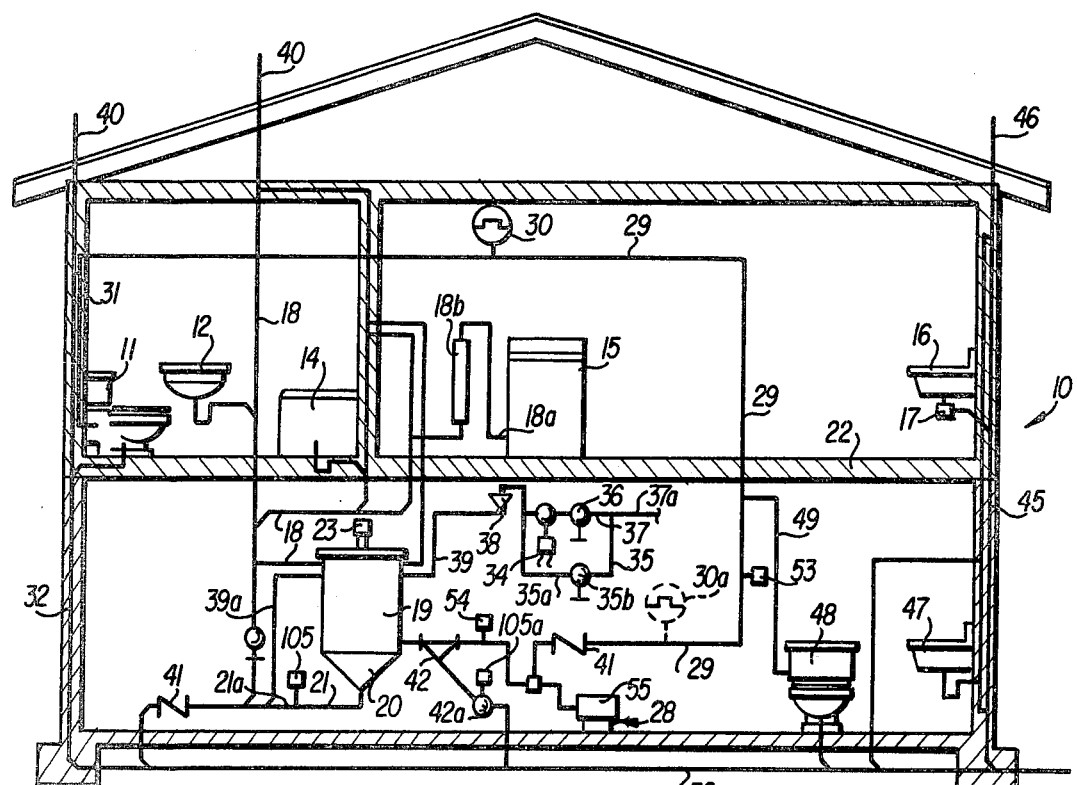
FIG. 1 is a schematic sectional view through a household illustrating one form of the invention.

In FIG. 1, a building comprising a house 10 is provided with conventional float tank water closet 11, lavatory 12, tub 14 and washer 15. The lavatory, tub and washer are connected to a source of suitable clean uncontaminated water through a conventional piping system which forms no part of the invention, as such, and is therefore not illustrated in the interests of clarity. The waste lines from these facilities are not, however, connected directly to the sewer line as in a conventional system. Instead, inasmuch as this water, known as "gray water," after having been used, remains relatively clean, it can again be used for flushing toilets. Therefore waste lines 18 are connected to a storage tank 19 for settling and solids removal. Washer 15 is provided with a discharge line 18a which discharges into an open-sight drain 18b.

Storage tank 19 is provided with a conical bottom having an included conical angle of not more than 120° and a valved drain system 21. The drain system is provided for the periodic removal of sediment, dirt and grit, and the like, which settles to bottom 20. It will be noted that tank 19 is disposed at a level below the main or first household floor 22 and therefore conventional gravity flow to the tank suffices for the purpose of collecting the gray water. The tank and its essential components are preferably enclosed in a separate compartment or box-like holder as described hereafter with reference to FIG. 9. Deodorant pellets may be added to the contents of the tank to remove odors, impart an unpleasant taste to the water, or color same or any combination thereof. An important feature of the system is in the provision of a filtering, chlorinating and bluing system for this reused gray water. A deodorizing canister designated generally by reference numeral 23, may be provided on an upper portion of the tank 19 which may contain a supply of liquid sanitizer, deodorizer and soft blue coloring agent which is gravity fed into the gray water in tank 19 in controlled amounts. Alternately, or in combination, canister 23 may also function as a vent to tank 19 and serve to deodorize material emitted therefrom. FIG. 6 shows further optional embodiment wherein a canister 27 is supported in a container 23a which is mounted by a bracket 18c affixed to line 18 and is provided with a conduit 24 having a tip 25 disposed in the flow path of the gray water flowing through the waste lines 18, immediately prior to discharge into the settling storage tank. Tip 25 is split as at 26, the bisection being of a character and sufficiently thin that it normally prevents the flow of the liquid 27 from its interior, except that upon being wetted on its exterior by the water flowing in the waste lines 18 it permits the flow of the liquid 27 to intermix in selected amounts in the flowing water. Thus it will be seen that this chlorinating means functions only while the gray water is being added to tank 19 and the tip 25 is wetted.

A flow reversible pump designated generally by reference numeral 28 automatically functions to displace water from tank 19 into the gray water feed pipe line 29 and to maintain the desired pressure therein. Water in this pipe is pumped to an upper portion of the household into an upper storage tank 30 which may be of diaphragm type to maintain pressure through the gray water feed system. The tank may be hidden in a closet or be in an attic or at any appropriate location where danger of the water therein freezing does not exist. A line pressure switch 53 is interposed between pump 28 and tank 30. Upon flushing water closet 11, gray water from the upper storage tank 30 flows through the conduit 29 thereto to replace water flushed from the tank of water closet 11. This flushed water and wastes therein are discharged to the sewer line 32. The drain system 21 of tank 19 also discharges to a sewer line 32. If desired, the upper storage tank 30 may be disposed in the general region of the main storage tank 19, such as at the location of tank 30a, for example. The function is essentially the same inasmuch as the entire system is maintained under pressure by pump 28 and by the head of pressure above the diaphragm whether in tank 30 or 30a. Tanks 30 or 30a also function as a reservoir for the several water closets. When the water closets are flushed, the fall in water level in the tank results in a lower pressure upon the line pressure switch 53 which, in turn actuates pump 28 to refill tank 30 or 30a and repeat the cycle. Pump 28, as previously indicated, is preferably reversible to back-flush periodically, for example, every twenty-four hours. Piping arrangements, per se, for reversing pump 28 are well-known and therefore are not shown.

A tank pressure switch 54 acts as a safety cutoff for pump 28. If the water level in tank 19 drops too low, switch 54 breaks the circuit to the electric motor 55 of pump 28 which will not then operate. Further, tank pressure switch 54, with a reduction in pressure in tank 19, causes a fill solenoid 34 in conduit 37 to open. As shown in detail in FIGS. 1 and 7, this causes fresh water from the building's fresh water system via a fresh water inlet to fill tank 19. Conduit 37 also has a manually operated gate valve 36. A manual fill 35 which bypasses the automatic fill may be used if necessary. This manual fill comprises a gate valve 35b in a conduit 35a. Both conduits 35a and 37 carry fresh water to a tank fill funnel 38 and a further conduit 39 which leads into tank 19. It should be noted that there is an air break between the conduit 37 and the funnel 38 to prevent the least possibility of contamination of the fresh water system. Valve 36 in conduit 37 is preferably adjusted to ensure that the flow of fresh water provided therein is not at a rate to exceed the cap capacity of funnel 38 for drainage into tank 19.

The valved drain system 21 is opened for a few moments periodically to drain off any sediment from tank 19. Also inasmuch as the quantity of water flowing into tank 19 from the washers, showers, etc., is normally greater than the quantity pumped out for water closet use, the water level in tank 19 rises and the gray water passes through an overflow 39a and is discharged to sewer line 32. This action is utilized to remove any surface film which may accumulate on the surface of the gray water. In larger buildings such as office buildings where this system can be incorporated, the reverse situation occurs and some makeup water is normally required.

Waste lines are vented conventionally through conduits as indicated by reference numeral 40 and check valves 41 are appropriately disposed in the system to prevent back flow. A strainer 42 is positioned in the pipe line 29 prior to pump 28 to prevent passage of solids therethrough. Reversing action of the pump 28 cleans the strainer.

A disinfecting system as shown in FIG. 8 may be optionally substituted for the systems shown in FIGS. 1 and 6. In this modification a receptacle 43 containing iodine crystals 44 is directly and removably interposed in the waste line 18 so that all gray water flowing to the settling storage tank must pass therethrough. The iodine crystals, like the chlorinating and bluing solution, function to deodorize as well as cleanse the stored water. For normal household use, the iodine crystals may remain effective for up to a year before replacement is required. The crystals may be added from time to time into receptacle 43 by removing a plug 43a. Line 18 which passes through the top of receptacle 44 almost touches the bottom of receptacle 43 whereby the crystals are slowly dissolved into the gray water passing therethrough.

In the arrangement shown in FIG. 1, kitchen sink 16 with its garbage disposal unit 17 are connected to a waste line 45 and the material therefrom is discharged directly into sewer line 32. A vent conduit for the waste line 45 is designated by reference numeral 46. Lower level fixtures such as the lavatory 47 and a water closet 48 also discharge directly into sewer line 32; however, the water closet 48 receives its water through a pipe line 49 connected to pipe line 29. The pipe provided for lines 29 and 49, which carry the recycled gray water, may, if desired, be of distinctive color and character such as yellow plastic. This provides an additional safeguard against accidental use of gray water for an undesired purpose.

In FIG. 7, the electrical components are shown diagrammatically. The main electric power supply (120 volt, sixty cycle AC current) is designated by reference numerals 50 and 50a; the main disconnect switch by 51; magnetic starter for motor 55 by 52; line pressure switch by 53; tank pressure switch by 54 and the pump motor by 55.

In FIG. 7A the pump wiring diagram is indicated whereby the power supply comprising 120 volt, sixty cycle AC conduits 107 and 108 provide electric current to a timer 106 which ordinarily retains in an opened or inactivated condition a further conductor which is a continuation of line 107 designated 107a. Solenoids 105 (for a valve 21a) and 105a (for valve 42a) cause drainage from tank 19 for a predetermined period of time; say thirty seconds once in each twenty-four hour period, into sewer line 32 whereby sediment and the like collected in the bottom of the tank 19 and in the strainer 42 are discharged.

Line pressure switch 53 activates electric motor 55 when pressure in conduit 29 is sufficiently low as may be caused by the flushing of a toilet (FIG. 7). Tank pressure switch 54 in a like manner actuates the fill solenoid 34 and at the same time inactivates motor 55 when water in tank 19 is low. This condition continues until the tank pressure has increased sufficiently to open tank pressure switch 54 which closes the circuit to line pressure switch 54 and permits pump motor 55 to operate. This provides a safety measure inasmuch as if the water in tank 19 is so low as to actuate the tank pressure switch 54 the lack of water for suction may cause damage to an operating pump 28.

Figure 2:
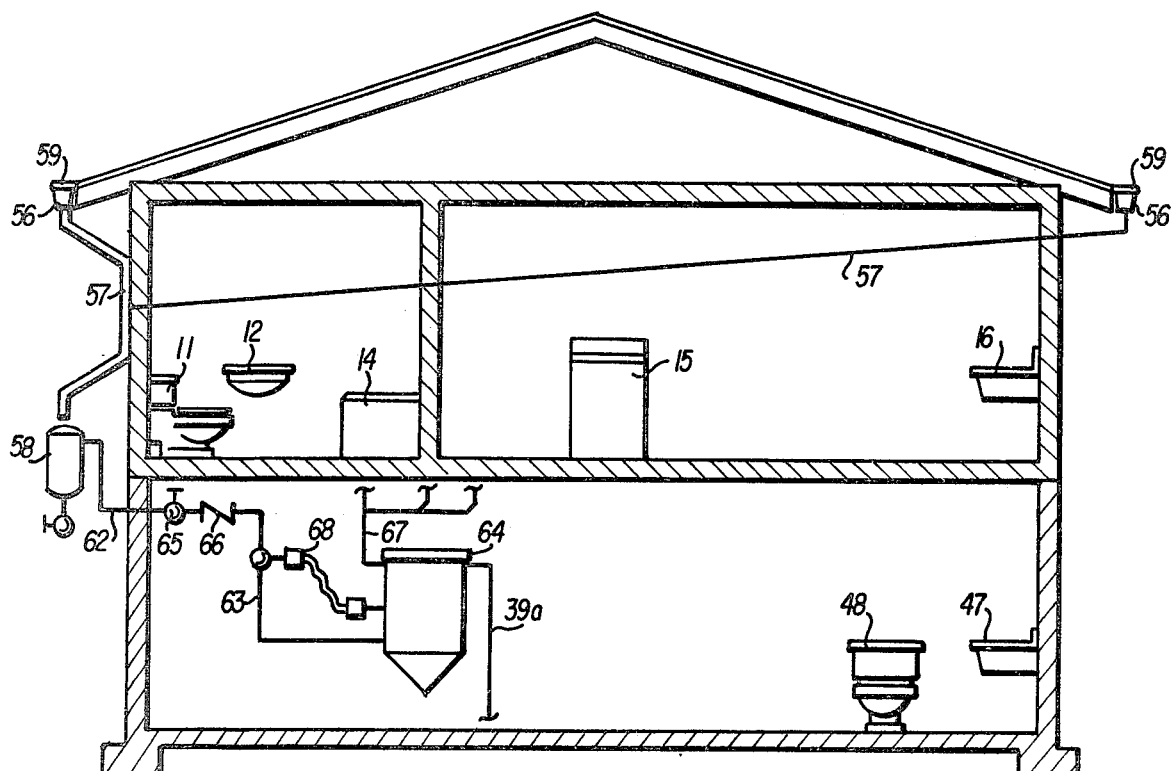
FIG. 2 is a similar view illustrating a modification of the device.

In FIG. 2, a modified arrangement for water conservation is illustrated. In conventional arrangements, storm water is either discharged directly to the soil or into a sewer line. In either instance its usefulness as a liquid volumetric vehicle is lost. In FIG. 2, storm water accumulated from gutters 56 is conducted by downspouts 57 to trap 58. The gutters are provided with screens 59 to eliminate leaves and twigs. Trap 58 shown in detail in FIG. 3, comprises a further debris eliminating screen 60 of convex configuration and disposed atop the receptacle 61 whereby debris washes off to the side and water is received through screen 60 into receptacle 61. An upper discharge conduit 62 connects to the receptacle at a point below screen 60 and above the bottom of receptacle 61 which has a discharge conduit with valve 62a. Conduit 62 is in communication with a pipe line 63 which carries the water to a tank 64. A valve 65 is disposed in line 63 to limit the flow of water as desired in case of a heavy storm or of a large roof area. A check valve 66 prevents the back flow of water from tank 64. In this arrangement the drains from the lavatory, tub and washer are illustrated in FIG. 1. If however, it is desired to use only storm water for the water closet, drain 67 may be entirely omitted. The lines from the tank 64 to water closets 11 and 48 and therefrom to the sewer line are also the same as in FIG. 1. Further, where it is not desirable to discharge storm water to the sanitary sewer, or where a septic field is utilized, a high limit switch closes a solenoid 68 in the storm line. The solenoid is normally closed but opens at a predetermined water level in the tank 64 and remains open until tank 64 is filled.

In FIG. 4, the system is further modified for use with an outdoor tank 69 mounted on a concrete base 70 disposed below ground. A manhole 71 is provided, and a utility pipe 73 and vent 72 are utilized for evacuating, as necessary and venting the tank. The lavatory, tub and washer water are, as before, fed to tank 69 through pipes 74 similar to pipes 18. An overflow line 75 discharges excess water from the tank to the sewer, whereas pipe 76 feeds water from the tank to pump 28 for circulation to water closet 11 and the system otherwise as disclosed with reference to FIG. 1. Tank 69 is tilted at a minimum pitch of 3" per foot and preferable at about 30° to 45+ relative to the horizontal to promote removal of solids and semi-solids therein. Utility pipe 73 terminates within tank 69 a short distance above its lowest point wherein pipe 76 is connected.

In FIG. 5 the salvaged gray water is recycled by a hydraulic ram or pumping device 77 which preferably comprises a water pump driven by a hydraulic motor of a type disclosed in U.S. Pat. No. 2,190,812, through the ram discharge line 78. This system is advantageous in the event of electric power failure or where no power is available. With the hydraulic device, as the water flows through the conduit 18 a portion thereof is pumped through line 78 to storage tank 30 for reuse. The remainder flows into tank 19 and otherwise the system is preferably as shown in FIG. 1 and thus also includes electric motor 55 which drives pump 28. However, it will be appreciated that device 77 may be substituted for the pump 28, including motor 55, in the embodiment shown in FIG. 1, providing the necessary energy for pumping a portion of it needed for the water closets with the remainder being discharged to sewer 32.

It should be noted that in tall buildings which are provided with cooling tower water, such water may readily be utilized for water closet flushing. At present, this cooling water is usually wasted by being discharged to the sanitary sewer. The discharge from such a cooling tower may be connected to the downspout as is the gutter 56 in FIG. 2.

Referring to FIG. 9, apparatus in accordance with the invention is illustrated in a self-contained transportable unit. This unit, designated generally be reference numeral 80, is contained in a parallelepiped framwork structure which has a width of approximately thirty inches, a length of approximately sixty inches, and an overall height of about sixty-four inches. The diameter of the holding tank 19 is thirty inches and the diameter of the pressure tank 30a is twenty inches. Although is FIG. 9 an overflow line 39a appears to extend beyond the length dimensions of the unit, in actuality this line extends in the corner space defined between the outer circumference of the holding tank and the box-shaped frame 81. It will be noted from FIG. 9 that frame 81 includes a platform 81a which directly supports motor 55 for pump 28. Also supported on the frame 81 via a further platform 81b is pressure tank 30a, and on a backboard 85, an electric timer control box 82, and an electrical connection panel 84. Gray water supply line 18 (a two-inch pipe in this embodiment) connected in the side of tank 19 near its top is at the same level and 180° displaced from overflow line 39a. Mounted on backboard 85 is fresh water inlet 37a which includes gate valve 36 controlled by solenoid 34. The manual fill by-pass 35 includes gate valve 35b. The inlet 37a and bypass 35 lead to conduit 37 which is spaced above funnel 38 which, in turn, leads into the interior of tank 19. Also mounted on backboard 85 is a filter 86 which has small diameter water conduit lines 86a and 86b leading from the upper and lower aspects thereof. Such lines connect to conduit 29 on either side of a gate valve 87 which is disposed in a conduit portion 29a that connects a pump discharge conduit portion 29b and the bottom of the pressure tank 30a. A further gate valve 90 is disposed in the discharge conduit portion 29c which connects pump discharge conduit portion 29b with the gray water outlet 29d for connection to conduit 29 as shown in FIG. 1.

In this embodiment the drain system 21 includes a gate valve 92 which is manually operated and a valve 21c operated by solenoid 105. The valve 21b is a check valve to ensure that the liquid flows in the system 21 in the direction of arrow 91 only. Strainer 42 is disposed between the inlet of pump 28 and the outlet conduit portion 29c of holding tank 19 in which a gate valve 92 is also disposed prior to the strainer.

A diaphragm switch 96 is connected to the interior of tank 19. Switch mechanism 96 is actuated by a first predetermined low level (low pressure) within tank 19 to open solenoid valve 34 and admit fresh water through valve 34 and conduit 37 into funnel 38. Such water continues to flow until a second predetermined higher level (higher pressure) within tank 19 is attained to actuate mechanism 96 whereby the solenoid valve 34 is no longer energized. When such occurs, resilient means within the solenoid valve 34 causes it to close.

Within tank 19, a plastic support 94 having a plurality of openings 95 is provided as illustrated in FIGS. 9 and 10. Support 95 is held by plurality of lugs 97 disposed at the same level along the interior of tank 19 near its top. Support 95, in turn, provides support for a one-half inch thick fiberglass filter 98 under a removal top 99 of tank 19.

Unit 80 is installed usually in the basement of a dwelling in an appropriate location and appropriate connections are made with gray water supply 18, sewer line 32, the water closet gray conduit 29 and fresh water conduit 37a. Also electrical connections are made to the control box 82 and connection panel 84. In operation, gray water supplied to the tank 19 is filtered by filter 98 and foam collecting on top of filter 98 moves across same whereby it is discharged through overflow line 39a. In the event that amount of gray water supplied to the tank 19 exceeds its capactiy, the excess overflows through line 39a to the sewer 32. If, on the other hand, not enough gray water for the purposes of the apparatus is retained in tank 19, the diaphragm switch mechanism 96 is activated and as previously explained, fresh makeup water is added via the fresh water conduit 37. Water closets are supplied by means of the pumping action of the pump 28 whereby water is drawn from the holding tank outlet 29e and discharged through conduit portion 29d. Pressure is maintained on the system by the pressure tank 30a and motor 55 of pump 28 is actuated by the reduction of pressure in conduit 29 through a pressure responsive switch which connects into box 82 to activate motor 55 via electrical line 100. The pressure responsive switch involved is designated by reference numeral 101 and is connected to tank 30a via a line 102 and to the control box 82 via a further conductive line 104.

As pressure changes within pressure tank 30a a small amount of water passes through liquid conduit lines 86a and 86b and filter 86 which contains iodine crystals. By this means, iodine in the amount needed is introduced into the system. In this connection, although valve 87 is normally a gate valve, it can be a check valve which allows a surge of water from pump 27 to enter tank 30a via such valve but it requires that water passing in the opposite direction pass through filter 86.

Box 82 contains a twenty-four hour timer and at appropriate times of the day, preferably after holding tank 19 has been inactive for a period, say at 4:00 a.m. or 5:00 a.m., the valve 21c is caused to open by means of a solenoid 105 which is electrically connected to the timing device in box 82 and sediment and the like which is collected in the bottom of tank 19 and also in the strainer 42 is caused to drain via the line 21 (gate valves 42b and 42c being normally in an open condition). An appropriate period is provided to accomplish the necessary draining, say thirty seconds to one or two minutes. After such appropriate period, the timer box 82 causes the solenoid 105 to close valve 21a whereupon the drainage ceases.

When water is received by the tank 19 through conduit 18 a flow occurs from left to right as seen in FIG. 9 across the fiberglass filter 98. Any solids or foam in the water tend to lie on top of the filter 98 and are moved to the right wherein they are received through the overflow conduit 39a and washed into the sewer 32. Filtered water, on the other hand, enters the tank. However, when the tank is partially drained by action of the timer as described above, any sediment or the like which may deposit on the walls of the conical bottom 20 is displaced and received via conduit 21 and valves 42c and 21c into the sewer 32. Periodically, or as otherwise required, the top 99 of tank 19 may be lifted whereby filter 98 is removed and either cleaned or, preferably discarded and replaced by a further like filter. For this reason, the top 99 is preferably made of a relatively light plastic material such as fiberglass plastic and, in practice, the tank 19 may also be made of a similar material. Wherein the tank is molded, it is advantageous to incorporate in the bottom 20 spiral-like furrows which terminate at the outlet into conduit 21 whereby a spiraling action of the draining gray water occurs and the scouring action of such drainage is enhanced.

The primary purpose for the relatively high pitch in the bottom of the tank 19 and also as shown for the tank 69 in FIG. 4 is to insure that sediment which may subsequently cause undesirable odors or otherwise contaminate the water does not permanently lodge in the tank 19. This result is enhanced by the utilization of the fiberglass filter 98 and the cleaning action due to the location and flow from conduit 18 across filter 98 and into the overflow conduit 39a.

Although the preferred embodiments of the invention are described above, it is to be understood that the invention is capable of other adaptations and modifications within the scope of the appended claims.

Having thus described my invention, what I claim as new and desire to secure by Letters Patent of the United States is:

1. A water conservation system comprising: means distributing clean water to selected household facilities for use therein; drain means in said selected facilities other than facilities which have their primary function for the disposal of human waste for delivering said water in the form of gray water from said selected facilities through a inlet conduit of a settling tank at a level below said facilities for the filtration and gravitational separation of solids therefrom; water pump means associated with said settling tank, said pump means having further conduit means for receiving water from said tank and delivering pressurized water to a storage receptacle having a pressure level sufficient whereby it can deliver gray water to said other facilities; a readily removable filter in said tank immediately below said inlet conduit means; and removable cover means for said tank whereby said removable filter can be removed and replaced by a fresh filter which is supported immediately below said inlet conduit means.

2. A system in accordance with claim 1 which includes water purification means adapted to destroy microorganisms which is associated with said settling tank for treating all water delivered from said drain means passing through said settling tank.

3. A system in accordance with claim 1 further comprising means in said settling tank for discharging foam and other material above said filter.

4. A system in accordance with claim 1 further comprising timed automatic means periodically removing gravitationally separated solids from said settling tank, said settling tank having a conical bottom with a drain at the lowest part thereof, said solids being removed through said drain.

5. A system in accordance with claim 4 wherein said conical bottom has an included angle of not more than 120°.

6. A water conservation system installation in a building which comprises a washing facility and a drainage conduit therefrom located at a first level, said conduit providing liquid passage means to a second level substantially lower than said first level, a storage tank receiving said liquid passage means at said second level, pump means associated with said tank adapted to convey water therefrom to the water inlet of a water closet, rain collection means on the roof of said building, rain water passage means with a rain water container and sediment trap means therein leading from said collection means to said tank, timed automatic means for periodically removing gravitationally separated solids from said tank, said tank having a conical bottom with a drain at the lowest part thereof, said solids being removed through said drain, said conical bottom having an included angle of not more than about 120°.

7. A system in accordance with claim 6 further comprising water purification means which destroys microorganisms and which is associated with said tank for treating all water received in said tank from said liquid passage means associated with said tank.

8. A system in accordance with claim 6 wherein a filter is supported in the upper portion of said tank, said drainage conduit entering said tank above said filter, said filter being readily removable and said tank having a cover thereon which can be lifted for removing and replacing said filter.

9. A water conservation system installation in a building which comprises a washing facility and a drainage conduit therefrom located at a first level, said conduit providing liquid passage means to a second level substantially lower than said first level, a storage and settling tank receiving said liquid passage means at said second level, pump means associated with said tank adapted to convey water therefrom to the water inlet of a water closet, said tank being generally cylindrical and having a longitudinal axis between 10° and 45° relative to the horizontal, an outlet from said tank to said pump means which enters said tank at substantially the lowest part thereof, and a drain from said outlet having a valve therein adpated for periodically flushing non-liquid material settling from water contained in said tank.

10. A system in accordance with claim 9 wherein further conduit enters said tank for the purpose of cleaning said tank, said further conduit having an opening immediately above the connection of said first mentioned conduit to said tank.

11. A system in accordance with claim 9 wherein said tank is located outside of said building.

* * * * *